(12) United States Patent
Javid et al.

(10) Patent No.: US 8,905,258 B2
(45) Date of Patent: Dec. 9, 2014

(54) FLEXIBLE COVER FOR FOOD CONTAINER AND METHOD FOR MANUFACTURING A FLEXIBLE COVER

(75) Inventors: Hassan Moghaddam Javid, Limhamm (SE); Ove Axelsson, Lund (SE)

(73) Assignee: EAZ PAC AB, Lund (SE)

( * ) Notice: Subject to any disclaimer, the term of this patent is extended or adjusted under 35 U.S.C. 154(b) by 712 days.

(21) Appl. No.: 12/735,680

(22) PCT Filed: Feb. 11, 2009

(86) PCT No.: PCT/SE2009/000077
§ 371 (c)(1),
(2), (4) Date: Aug. 6, 2010

(87) PCT Pub. No.: WO2009/102255
PCT Pub. Date: Aug. 20, 2009

(65) Prior Publication Data
US 2010/0320260 A1 Dec. 23, 2010

(30) Foreign Application Priority Data
Feb. 15, 2008 (SE) .................................. 0800349-3

(51) Int. Cl.
*B65D 75/00* (2006.01)
*B31B 39/00* (2006.01)
*B31B 1/26* (2006.01)
*B31B 1/00* (2006.01)
*A47J 36/06* (2006.01)

(52) U.S. Cl.
CPC ....................................... *A47J 36/06* (2013.01)
USPC .......................... 220/287; 229/87.08; 493/210

(58) Field of Classification Search
CPC ..................... B65D 41/22; B65D 2543/00296; B65D 65/10; B65D 2577/20; B65D 43/02
USPC ............ 229/125.38, 125.22; 220/287; 383/75
See application file for complete search history.

(56) References Cited

U.S. PATENT DOCUMENTS 2,080,108 A * 5/1937 Brandstein .................... 215/321
2,432,662 A 12/1947 Gardner
(Continued)

FOREIGN PATENT DOCUMENTS

WO  WO 2005/115860   12/2005

OTHER PUBLICATIONS

International Search Report.
(Continued)

*Primary Examiner* — Gary Elkins
*Assistant Examiner* — Christopher Demeree
(74) *Attorney, Agent, or Firm* — Harness, Dickey & Pierce, P.L.C.

(57) ABSTRACT

A flexible cover (1) for a food container (4) comprising a flexible film (2) and an elastic thread (3) is presented. The elastic thread (3) is attached to the peripheral edge (8) of the flexible film (2) by a channel (5) formed of the flexible film (2) around the elastic thread (3). The channel (5) exerts a circumferential, compressive force on the elastic thread (3), whereby the elastic thread (3) is fixed to the flexible film (2) by friction between the flexible film (2) and the elastic thread (3), and the elastic thread (3) forms a loop around the peripheral edge (8) of the flexible film (2), the loop having two ends (6, 7) overlapping and abutting in a longitudinal direction of the elastic thread (3). A method for manufacturing a flexible cover (1) is also presented.

19 Claims, 8 Drawing Sheets

(56) References Cited

U.S. PATENT DOCUMENTS

| | | | |
|---|---|---|---|
| 2,490,451 A | | 12/1949 | Magid |
| 2,580,075 A | | 12/1951 | Horton et al. |
| 3,246,446 A | | 4/1966 | Powers |
| 5,133,607 A | * | 7/1992 | Bonke .............................. 383/75 |
| 5,529,395 A | * | 6/1996 | French ............................ 383/75 |
| 6,276,551 B1 | | 8/2001 | Miller, II |
| 7,631,776 B2 | * | 12/2009 | Vovan et al. .................. 220/266 |
| 2004/0099666 A1 | | 5/2004 | Ordiway |
| 2009/0183807 A1 | * | 7/2009 | Sadlier ......................... 150/154 |

OTHER PUBLICATIONS

International Preliminary Report on Patentability dated Aug. 26, 2010 for corresponding International Application No. PCT/SE2009/000077.

* cited by examiner

FLEXIBLE COVER FOR FOOD CONTAINER AND METHOD FOR MANUFACTURING A FLEXIBLE COVER

TECHNICAL FIELD OF THE INVENTION

The present invention relates to a flexible cover for a food container comprising a flexible film and an elastic thread. The present invention also relates to a method of manufacturing a flexible cover for a food container.

BACKGROUND ART

To use various kinds of protective caps to protect food from being contaminated or dried out during storage is today common in the catering trade as well as in the home of private persons. Another reason to use such caps is to maintain the freshness of the food covered by the protective caps. The protective caps are available in different shapes and sizes, adapted to different receptacles in which the food can be kept, e.g. baking plates, roasting pans, pots, pans and the like. There are also protective caps adapted to fit receptacles of dimensions specified by the Gastronorm system which are commonly used throughout the catering trade.

These protective caps for protecting food are generally made of thin plastic foil with a resilient band attached to the foil. When the protective cap is placed over the opening of a food receptacle, the resilient band is stretched in order to fit the protective cap around the food receptacle.

The resilient band is generally sewn or stitched to the plastic foil. The sewing or stitching is a process that needs to be performed sequentially and is therefore time consuming. It does also incur costs related to the machinery needed for the sewing or stitching. The use of a sewing thread introduces a third material in addition to the plastic foil and the resilient band, which increase the overall cost of the protective cap.

U.S. Pat. No. 6,276,551 discloses a cap for beverage containers that prevents foreign substances from entering an opening of the beverage container. The cap comprises at least one flexible non-wetting sheet with an outer surface, an inner surface and an edge portion located at the outer periphery. The cap also has a skirt portion located adjacent to and within the edge portion. An elastic portion capable of dilating is located adjacent to and within the skirt portion. The inner surface of the flexible non-wetting sheet covers the opening of the beverage container when in use.

The elastic portion is created by securing an elastic cord to the flexible sheet by, for example, using an adhesive. The use of an adhesive for securing the cord to the elastic sheet is also a time consuming method requiring substantial machinery.

SUMMARY OF THE INVENTION

It is an object of the present invention to provide an improvement of the above prior art.

A particular object is to provide a flexible cover for a food container that may be manufactured in an efficient and cost effective way.

These and other objects as well as advantages that will be apparent from the following description of the present invention are achieved by a flexible cover for a food container and a method for manufacturing the same according to the respective independent claims. Preferred embodiments are defined in the dependent claims.

Hence a flexible cover for a food container is provided, comprising a flexible film and an elastic thread. The elastic thread is attached to the peripheral edge of the flexible film by a channel formed of the flexible film around the elastic thread. The channel exerts a circumferential, compressive force on the elastic thread, whereby the elastic thread is fixed to the flexible film by friction between the flexible film and the elastic thread, and the elastic thread forms a loop around the peripheral edge of the flexible film, the loop having two ends overlapping and abutting in a longitudinal direction of the elastic thread.

The inventive flexible cover is advantageous in that no additional material needs to be introduced in order to attach the thread to the film. It is also advantageous in that the elastic thread may be attached to the flexible film in a fast, easy and cost effective way.

The elastic thread may be fixed to the flexible film in the longitudinal direction of the elastic thread, by the friction between the flexible film and the elastic thread, which is advantageous in that no additional fastening means are necessary.

The elastic thread may be fixed to the flexible film in the longitudinal direction of the elastic thread mainly by the friction between the flexible film and the elastic thread, which implies that no or only insignificant additional means for fastening of the elastic thread is necessary. In fact, the elastic thread may be fixed to the flexible film only by friction.

The channel may be formed by a portion of the peripheral edge of the flexible film. The portion is then folded around the elastic thread and attached to an unfolded portion of the flexible film. This is advantageous in that no additional material or adhesive need to be used, which lowers the overall cost and reduces the production time.

As mentioned, the channel exerts a circumferential, compressive force on the elastic thread, which is advantageous in that the elastic thread is securely fixed within the channel.

The portion of the peripheral edge of the flexible film that is folded around the elastic thread and the unfolded portion of the flexible film may be fused together. This provides a strong joint that may be produced in a fast, easy and cost effective way.

The elastic thread may be attached along the entire periphery of the flexible film, with the result that the flexible cover is capable of tightly sealing a food container.

As said, the elastic thread forms a loop around the peripheral edge of the flexible film, the loop having two ends overlapping and abutting in a longitudinal direction of the elastic thread, with the result that friction is developed between the two ends.

The peripheral edge of the flexible film may be longer than the circumference of the loop when the elastic thread is in a relaxed state, with the result that the periphery of the flexible cover may be stretched and fitted around food containers of different sizes and shapes.

The flexible film may be made of LDPE (Low density polyethylene), a highly flexible material suitable for being used with food due to its clean unreactive nature.

The elastic thread may be made of natural rubber, which is advantageous in that the natural rubber is not affected when the elastic film is fused together. Natural rubber does also show good friction characteristics, enhancing the friction between the elastic thread and the flexible film.

The elastic thread may have a thickness of 0.2-1.5 mm, which is advantageous in that a sufficient elasticity and strength is achieved. The method for manufacturing a flexible cover for a food container comprises the steps of arranging a flexible film on top of a fixture, whereby a portion of a peripheral edge of the flexible film is positioned outside an outer periphery of the fixture, applying and stretching an elastic thread along the outer periphery of the fixture, and positioning the elastic thread in a groove adapted to hold the elastic thread and arranged along the outer periphery of the fixture, said elastic thread forming a loop around the peripheral edge of the flexible film, the loop having two ends overlapping and abutting in a longitudinal direction of the elastic thread, whereby the elastic thread covers the portion of the peripheral edge of the flexible film, folding the portion of the peripheral edge of the flexible film positioned outside the elastic thread around the elastic thread, attaching the elastic thread to the flexible film by attaching the folded portion of the flexible film positioned outside the elastic thread to a portion of the flexible film positioned inside the elastic thread, whereby a channel is formed or created around the elastic thread, and releasing the flexible film and the elastic thread attached thereto from the fixture, whereby the channel exerts a circumferential, compressive force on the elastic thread and the elastic thread is fixed to the flexible film by friction between the flexible film and the elastic thread.

The method is advantageous in that a flexible cover for a food container may be produced in a simple, fast and cost effective way.

The step of arranging the flexible film on top of the fixture may include holding the flexible film to the fixture by an applied vacuum, resulting in that the film is held fix in a secure but still simple way.

As mentioned, the step of applying and stretching the elastic thread along the outer periphery of the fixture includes positioning the elastic thread in a groove adapted to hold the elastic thread. The groove is arranged along the outer periphery of the fixture. This is advantageous in that the elastic thread is secured during the attaching of the flexible film to the elastic thread.

The step of folding the portion of the peripheral edge of the flexible film positioned outside the elastic thread around the elastic thread may be performed by a stream or flow of hot air, which is advantageous in that the flexible film is folded in a simple, fast and efficient way.

The step of attaching the elastic thread to the flexible film by attaching the folded portion of the flexible film positioned outside the elastic thread to the portion of the flexible film positioned inside the elastic thread may be performed by heat sealing. This is advantageous in that the attachment is simple and fast and creates a strong joint.

The heat sealing may be performed by the stream of hot air.

The step of folding the portion of the peripheral edge of the flexible film positioned outside the elastic thread around the elastic thread and the step of heat sealing may be performed in sequence by the stream of hot air. This is advantageous in that a simple, fast and cost effective method is achieved.

BRIEF DESCRIPTION OF THE DRAWINGS

The above, as well as additional, objectives, features and advantages of the present invention will be better understood through the following illustrative and non limiting detailed description of embodiments of the present invention, with reference to the accompanying drawings.

DETAILED DESCRIPTION OF PREFERRED EMBODIMENTS OF THE INVENTION

Figure 1:
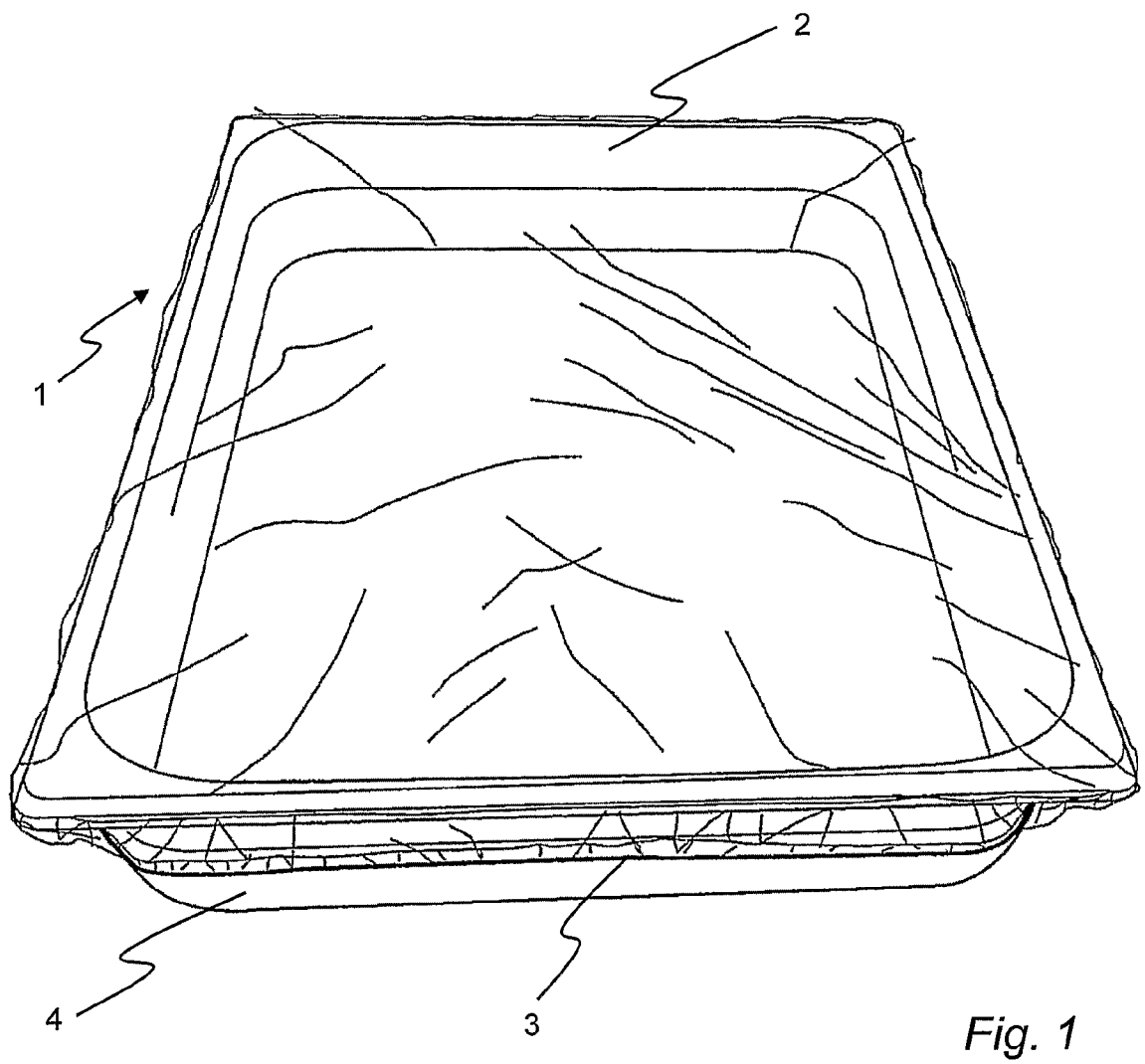
FIG. 1 is a perspective view illustrating a flexible cover for a food container placed over a food container.

A flexible cover 1 for a food container is illustrated in FIG. 1. The transparent cover 1 consists of a flexible film 2 of LDPE (low density polyethylene) and an elastic thread 3 of natural rubber with a circular cross-section. The flexible cover 1 is placed on top of a food container 4.

Figure 2:
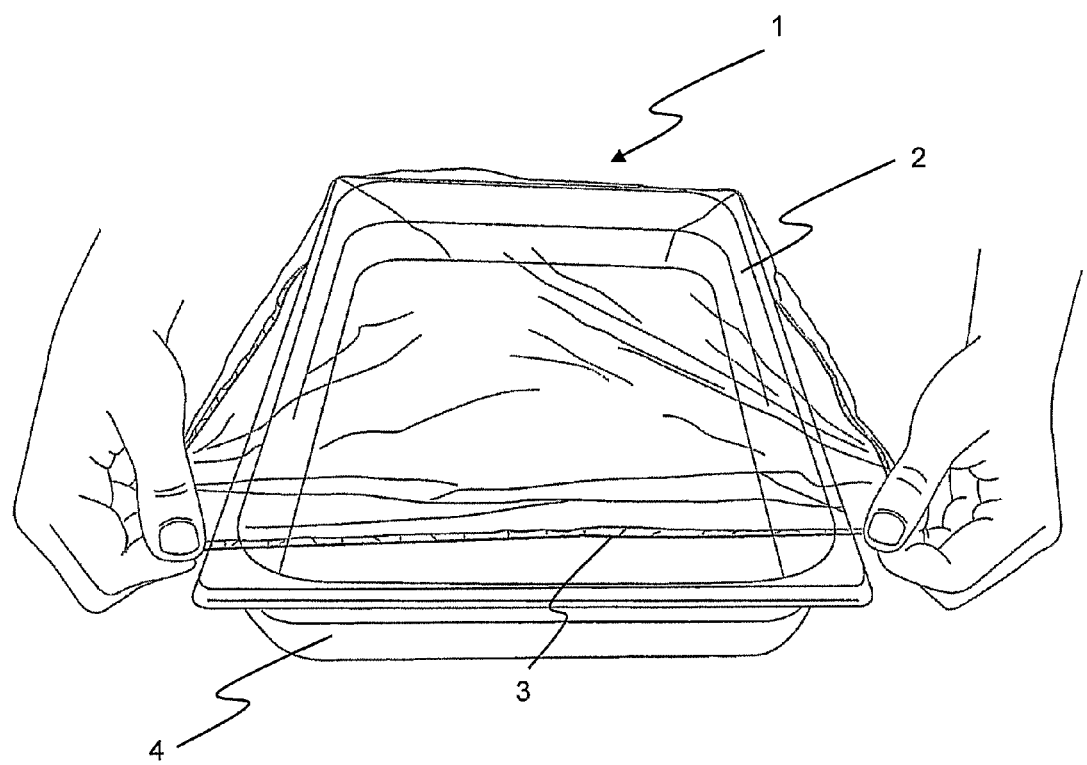
FIG. 2 is a perspective view illustrating how the flexible cover is being placed on a food container.

In FIG. 2 the flexible cover 1 is being placed over a food container 4 by stretching the elastic thread 3.

Figure 3:
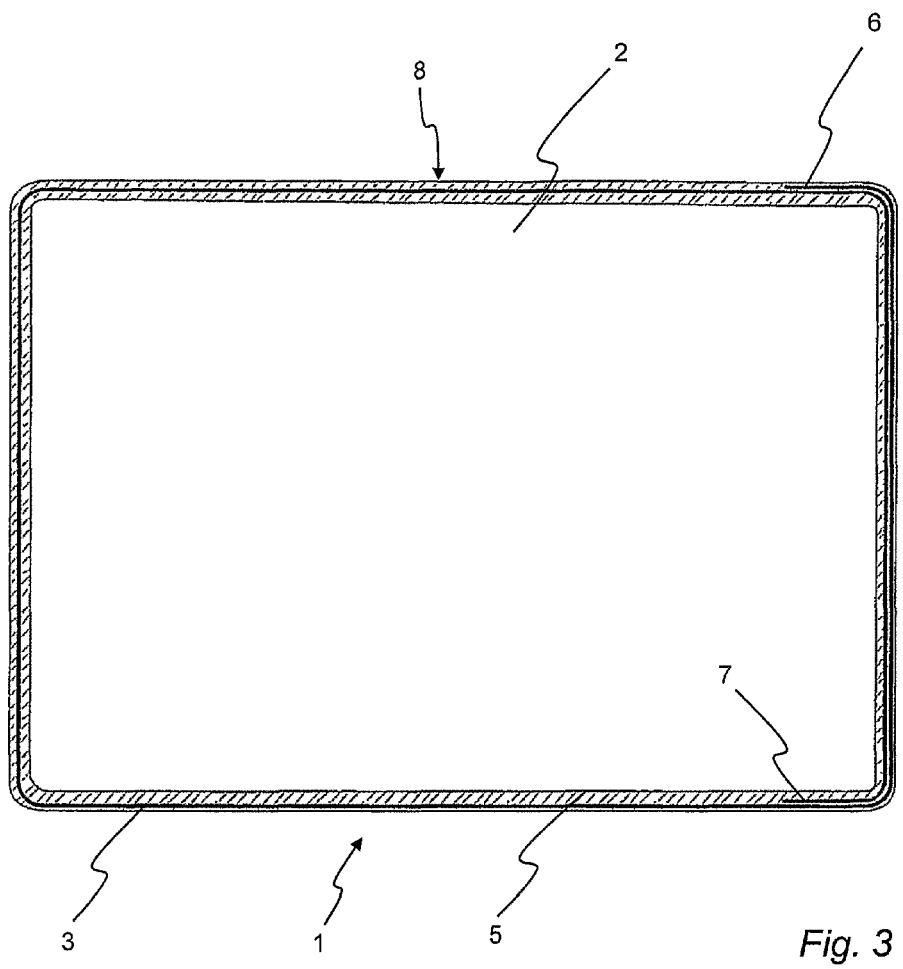
FIG. 3 is a schematic top view illustrating the flexible cover according to the invention.

FIG. 3 illustrates the flexible cover 1 schematically viewed from the top in an extended state. A channel 5 is formed by folding the flexible film 2 around the elastic thread 3. The outer peripheral edge 8 of the flexible film 2 is folded around the elastic thread 3 in order to form a channel 5 that encompasses the elastic thread 3 along the entire periphery of the flexible film 2. The outer peripheral edge 8 of the flexible film 2 is a portion located close to the edge of the flexible film surface. The thickness of the elastic thread 3 is preferably in the range 0.2-1.5 mm. A first end 6 of the elastic thread 3 overlaps a second end 7 of the elastic thread 3 along a portion of the periphery of the flexible cover 1.

The channel 5 that is formed around the elastic thread 3 is constructed to be sufficiently tight to create friction between the flexible film 2 and the elastic thread. The friction needs to amount to a level where the elastic thread 3 becomes fixed in its longitudinal direction relative to the flexible film 2 only or mainly by friction. In other words, the flexible film 2 creates a tight fit, i.e. abuts closely, to the elastic thread 3, thereby creating a frictional effect between the flexible film 2 and the elastic thread 3. This is achieved by stretching the elastic thread 3 during formation of the channel 5. When the elastic thread 3 is stretched it becomes thinner than in its relaxed state. The relaxed state is the state where the elastic thread is not stretched at all, in other words, when the elastic thread 3 is not subjected to any tension forces. The fact that the elastic thread 3 becomes thinner when stretched implies that the elastic thread 3 will expand and become thicker within the channel 5, once transferred to its relaxed state. The elastic thread 3 will therefore become fixed in its longitudinal direction due to friction between the flexible film 2 and the elastic thread 3. The outer periphery of the flexible film 2 will crinkle when the elastic thread 3 is transferred to its relaxed state, with the result that the elastic thread 3 again may be stretched in order to be fitted on a food container 4.

Of course, the channel 5 also fixes the thread 3 to the flexible film 2 in the transversal direction of the elastic thread 3. Preferably, the thread 3 is fixed to the film 2, both in the longitudinal direction and transversal direction of the thread 3, only by means of the channel 5 surrounding the thread 3. By overlapping the first end 6 and the second end 7 of the elastic thread 3, the flexible cover 1 becomes elastic around its entire periphery. The first end 6 and the second end 7 of the elastic thread 3 are also being pressed together within the channel, creating a frictional effect between the ends 6, 7, in the longitudinal direction of the thread 3. In other words it is preferred to overlap the two ends 6,7 to secure the two ends 6,7 to each other by the friction exerted between the two ends 6,7.

Preferably, the flexible cover 1 consists only of the flexible film 2 and the elastic thread 3. No additional materials are used even if it would be possible.

Figure 4:
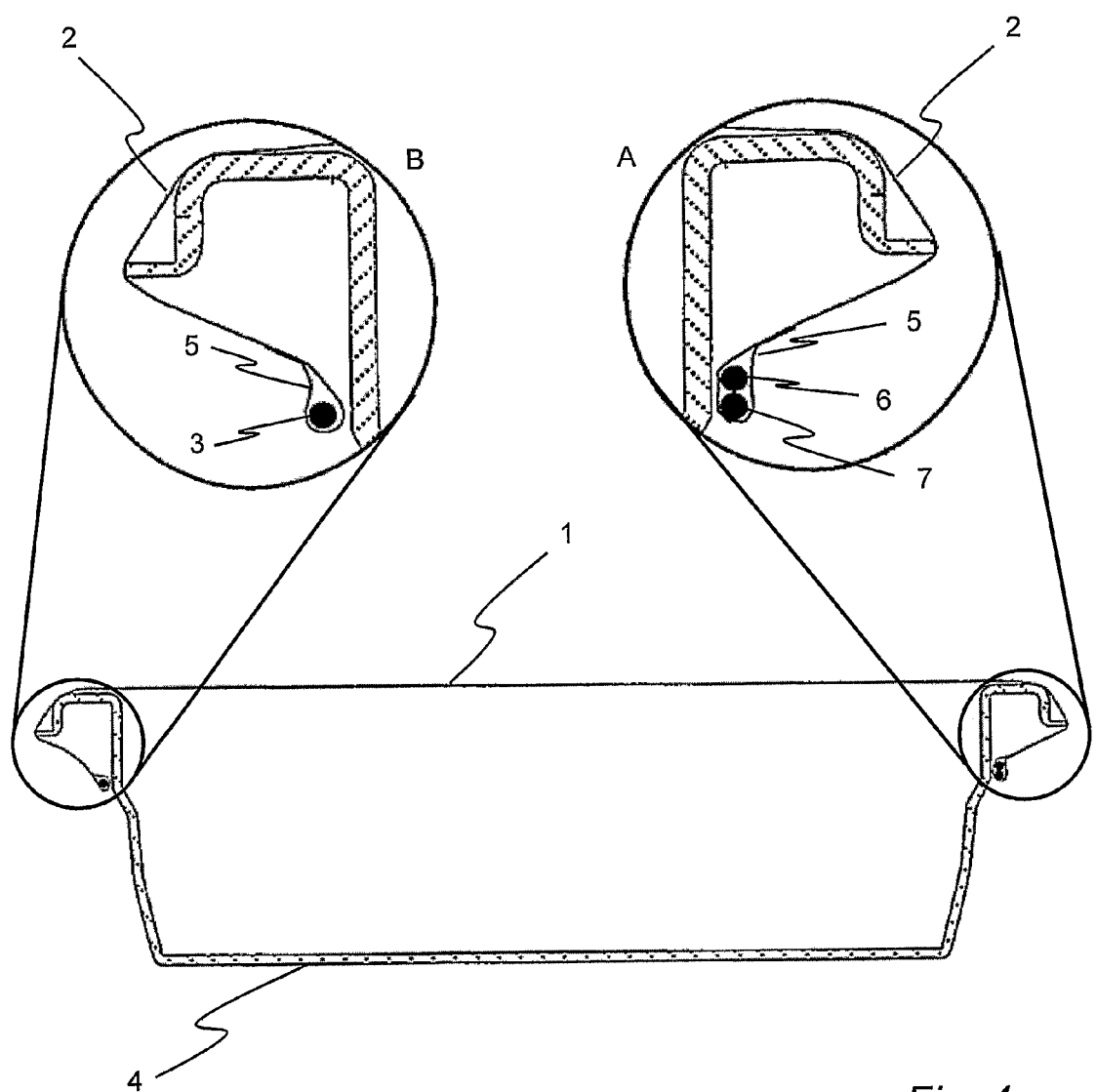
FIG. 4 is a schematic cross-sectional view illustrating the flexible cover placed over a food container.
Figure 5:
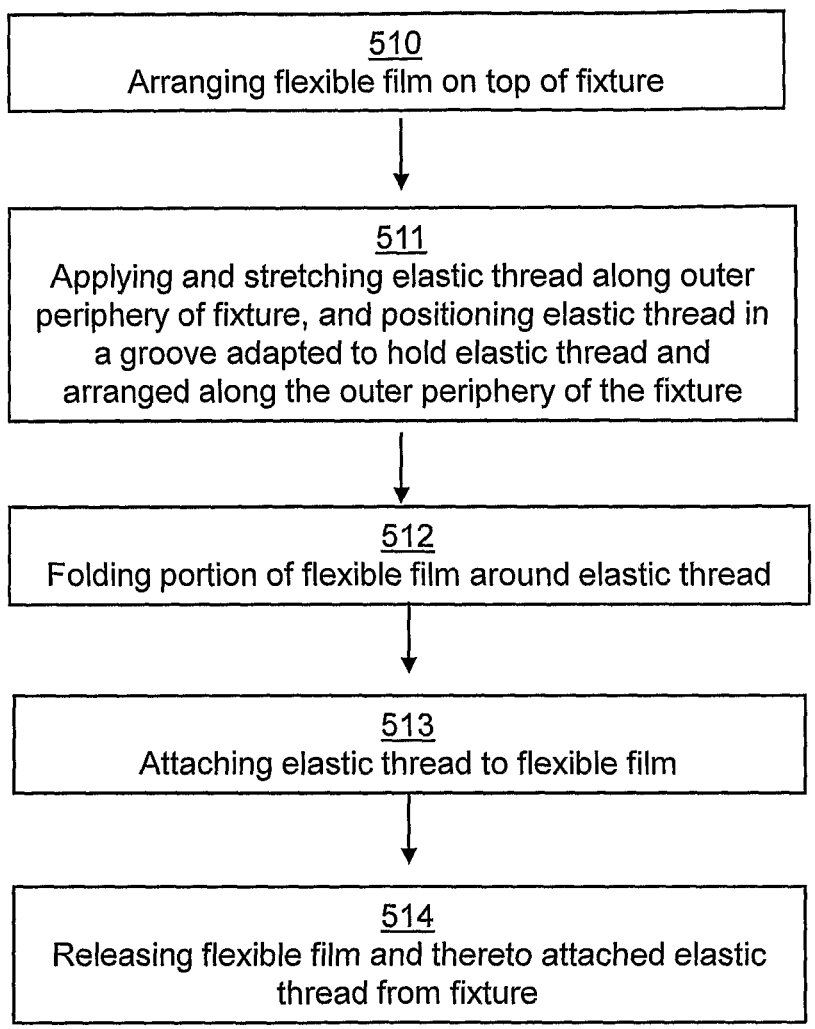
FIG. 5 is a block diagram illustrating the method according the invention.
Figure 6:
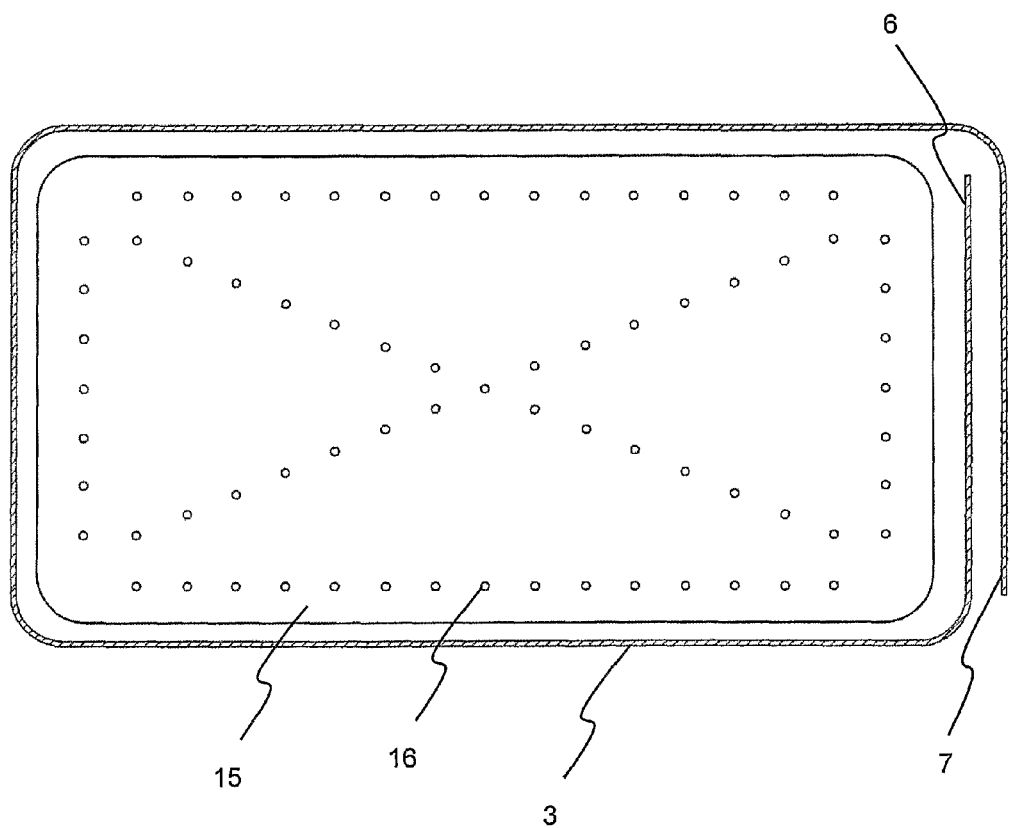
FIG. 6 is a schematic top view illustrating a fixture and an elastic thread.
Figure 7:
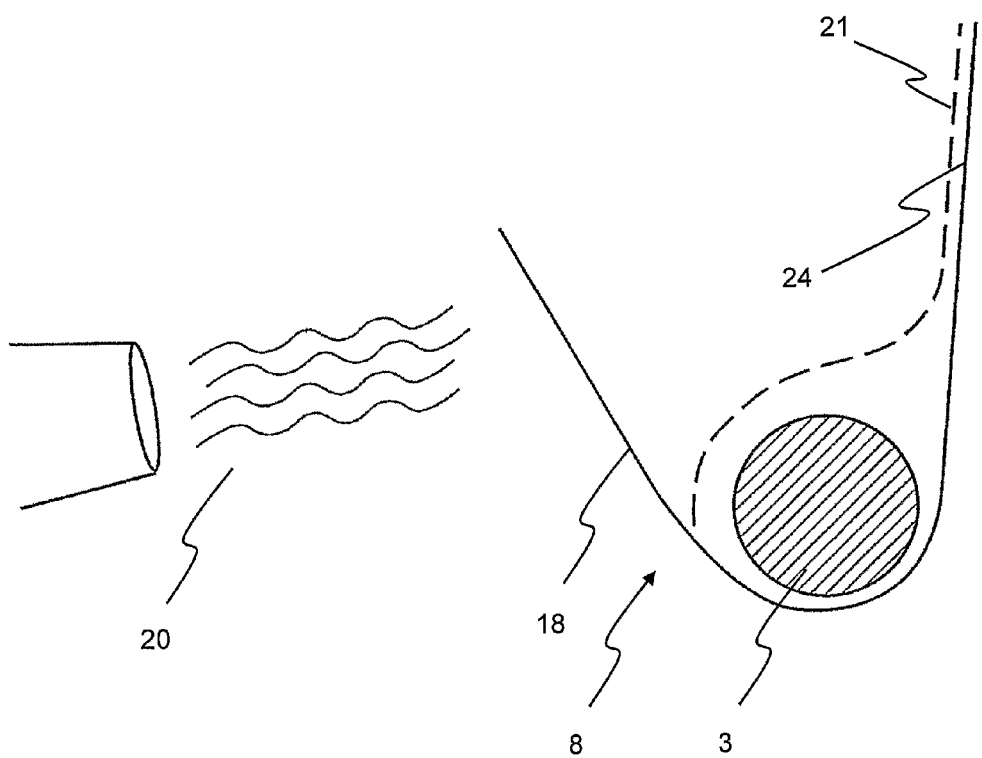
FIG. 7 is a schematic cross-sectional view illustrating the folding of the flexible film around the elastic thread by means of hot air.

In FIG. 4 the flexible cover 1 is placed on top of a food container 4. The outer periphery of the flexible cover 1 comprising the channel 5 is magnified on both sides. A first magnification A and a second magnification B are presented within the figure. In the first magnification A the first end 6 of the elastic thread 3 is overlapping the second 7 end of the elastic thread within the channel 5. In the second magnification B no overlap of the elastic thread 3 takes place within the channel 5. The channel 5 is only schematically illustrated and not shown with a tight fit, with respect to the elastic thread 3, as is the case in the actual flexible cover 1.

Now referring to FIGS. 5-8. In the first step 510 a flexible film 2 is arranged on top of a fixture 15. The flexible film 2 is fastened to the surface of the fixture 15 by applying a vacuum to the surface of the flexible film 2. The vacuum is applied to the surface of the flexible film 2 by holes 16 in the surface of the fixture 15. The holes 16 are connected through vacuum channels 17 which are embedded in the fixture 15. In other words the flexible film 2 is held against the surface of the fixture 15 by an applied vacuum. The size of the flexible film 2 is larger than the top surface of the fixture 15. As a result, a portion 18 of the flexible film 2 extends outside the top surface of the fixture 15.

In the second step 511 an elastic thread 3 is first stretched and then wound around the portion 18 of the flexible film 2 that is located outside the outer periphery 9 of the fixture 15. At the same time the elastic thread 3 is wound around the outer periphery 9 of the fixture 15 and inserted into a groove 19. The word outside refers to a portion situated further away from the centre of the flexible film 2 than, for example, the edge of the fixture 15 or the elastic thread 3. The first end 6 and the second end 7 of the elastic thread 3 are overlapping along a portion of the outer periphery 9 of the fixture 15. After the stretched elastic thread 3 has been inserted into the groove 19, the elastic thread 3 is relaxed, in other words the elastic thread 3 is no longer subjected to any external tensional forces. By relaxing the elastic thread 3, the diameter of the elastic thread becomes larger and the elastic thread 3 is therefore held in the groove 19 due to the compressive force between the expanded elastic thread 3 and the inside of the groove 19. Note that also that the flexible film 2 is inserted between the elastic thread 3 and the groove 19 implying that also the flexible film 2 is held in position by the compressive force between the expanded elastic thread 3 and the inside of the groove 19. Also note that the groove 19 is only schematically illustrated, in other words the groove 19 is in reality deeper and of any suitable shape for holding the elastic thread 3 in a secure way.

Figure 8:
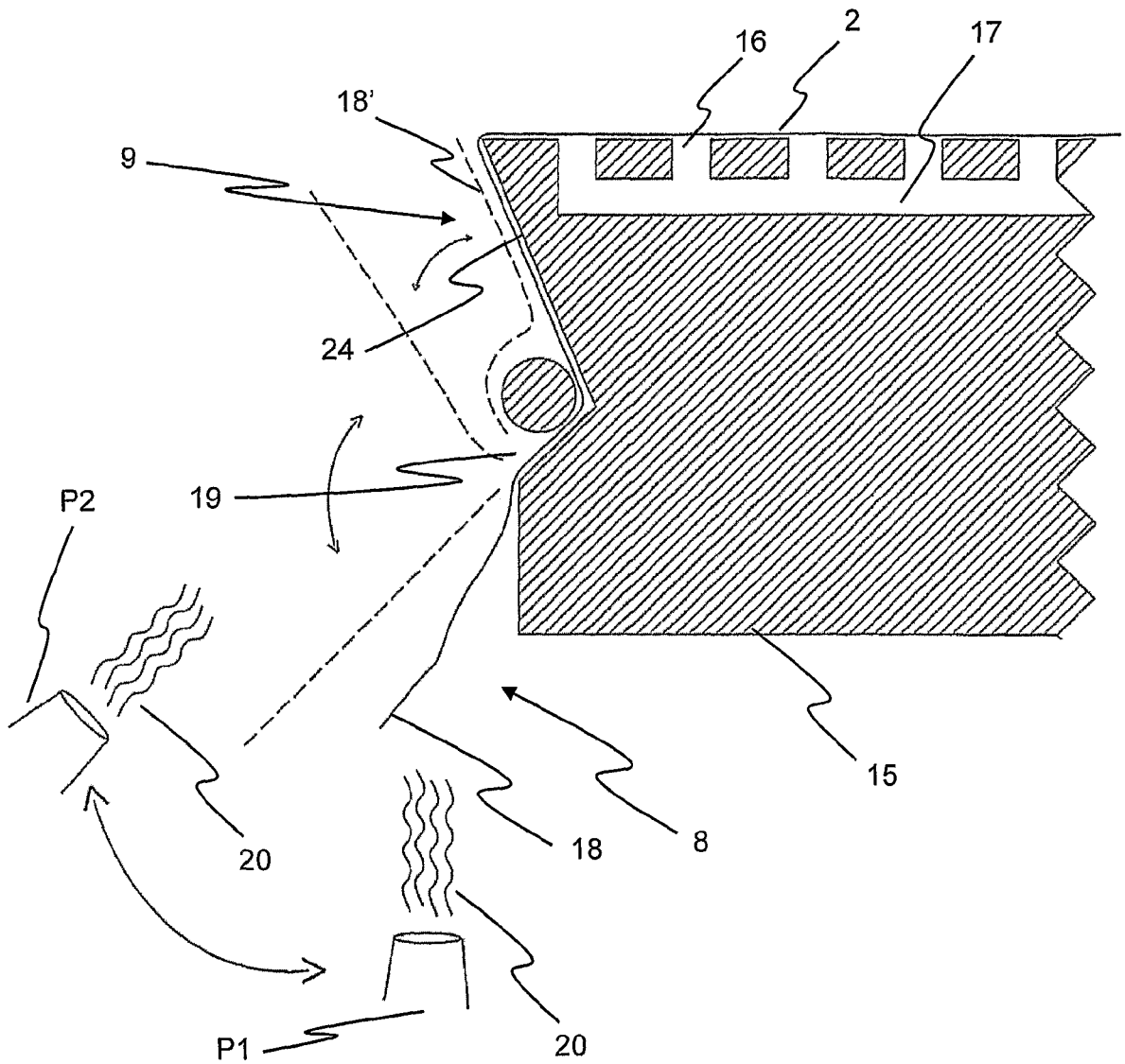
FIG. 8 is a schematic cross-sectional view illustrating the folding of the flexible film around the elastic thread, situated within the groove of the fixture.

In the third step 512 of the method the portion 18 of the flexible film 2 located outside the elastic thread 3 is folded around the elastic thread 3. In other words the portion 18 of the flexible film 2 located between the groove 19 and the outer peripheral edge 8 of the flexible film 2 is folded around the elastic thread 3, which is located in the groove 19. The folding of the portion 18 of the flexible film 2 is performed by a stream of hot air 20. The stream of hot air 20 simply blows the portion 18 of the flexible film 2 to the position 18' shown in phantom in FIGS. 7 and 8. In FIG. 8 also two intermediate positions are shown, illustrating how the folding portion 18 of the flexible film 2 is transferred to the final position 18'. As shown in FIG. 8 the stream of hot air 20 is transferred from a first position P1 to a second position P2. This is done in order to transfer the folding portion 18 of the flexible film 2 to its final position 18' in an efficient and fast way. It is also possible to use a static stream of hot air 20 and instead move the fixture 15 in order to transfer the folding portion 18 of the flexible film 2 to its final position 18'.

In the fourth step 513 of the method the portion 18 of the flexible film 2 is attached to an unfolded portion 24 of the flexible film 2 located inside the elastic thread 3. The stream of hot air 20 is then heating the flexible film to such an extent that the folded portion 18 located outside the elastic thread 3 of the flexible film 2 is fused together with the unfolded portion 24 of the flexible film 2 located inside the elastic thread 3. In other words the folded portion 18 is heat sealed to the unfolded portion 24, thereby forming the channel 5. When the heat sealing is performed with a stream of hot air 20 a material combination of LDPE and natural rubber is preferred, since this material combination makes it possible to fuse together the folded portion 18 and the unfolded portion 24 of the LDPE flexible film 2 without damaging the elastic thread 3 of natural rubber.

In one embodiment the third step 512 and the fourth step 513 of the method are performed in sequence by moving the stream of hot air 20 from the first position P1 to the second position P2. The stream of hot air 20 is then maintained in the second position P2 until the folded portion 18 and the unfolded portion 24 of the flexible film 2 are fused together.

In the fifth step 514 of the method the completed flexible cover 1 is removed from the fixture 15 by stretching the elastic thread 3. When the elastic thread 3 is stretched it becomes thinner again and is therefore released from the groove 19. At the same time air is blown through the channels 17 and out through the holes 16 in order to release the flexible film 2 from the fixture 15. Once loosened from the fixture 15 the elastic thread 3 is transferred into its relaxed state. By doing this, the elastic thread 3 becomes thicker, with the result that the elastic thread 3 becomes even more fixed in its longitudinal direction within the channel 5. At the same time the elastic thread becomes shorter with the result that the periphery of the flexible film 2 becomes crinkled along the elastic thread 3.

It will be appreciated that a person skilled in the art can modify the above-described embodiments in many ways and still use the advantages of the invention as shown in the embodiments above. Thus, the invention should not be limited to the shown embodiments but should only be defined by the appended claims.

For example the elastic thread 3 may have many different types of cross-sectional shapes or be made of various elastic materials. The flexible film 2 may also exhibit different properties. The flexible film 2 may for example be made of various flexible materials of different thicknesses or shapes. The flexible film 2 may be transparent, semitransparent or opaque. It may also be UV-proof in order to protect the covered food from UV-radiation. Also the method may be performed in different ways. For example the flexible film 2 and the elastic thread 3 may be fixed to the fixture 15 in various ways. Also the folding and sealing process may be achieved by different means.

The invention claimed is:

1. A flexible cover for a food container, the flexible cover comprising:
   a flexible film and an elastic thread, whereby the elastic thread is attached to the peripheral edge of the flexible film by a channel formed of the flexible film around the elastic thread, wherein the channel exerts a circumferential, compressive force on the elastic thread, whereby the elastic thread is fixed to the flexible film by friction between the flexible film and the elastic thread such that a locking effect is obtained by the friction, and such that the elastic thread forms a loop around the peripheral edge of the flexible film, the loop having two ends overlapping within the channel, the two ends abutting in a longitudinal direction of the elastic thread, and the two ends being enclosed by the channel.

2. The flexible cover according to claim 1, wherein the elastic thread is fixed to the flexible film in the longitudinal direction of the elastic thread, by the friction between the flexible film and the elastic thread.

3. The flexible cover according to claim 1, wherein the channel is formed by a portion of the peripheral edge of the flexible film, whereby said portion is folded around the elastic thread and attached to an unfolded portion of the flexible film.

4. The flexible cover according to claim 3, wherein the portion of the peripheral edge of the flexible film that is folded around the elastic thread and the unfolded portion of the flexible film are fused together.

5. The flexible cover according to claim 1, wherein the elastic thread is attached along the entire periphery of the flexible film.

6. The flexible cover according to claim 1, wherein the peripheral edge of the flexible film is longer than the circumference of the loop when the elastic thread is in a relaxed state.

7. The flexible cover according to claim 1, wherein the flexible film is made of LDPE (low density polyethylene).

8. The flexible cover according to claim 1, wherein the elastic thread is made of natural rubber.

9. The flexible cover according to claim 1, wherein the elastic thread has a thickness of 0.2-1.5 mm.

10. The flexible cover according to claim 1, wherein the overlap of the two ends of the loop is configured to extend along one side of the food container.

11. The flexible cover according to claim 10, wherein the overlap is configured to extend along about an entire length of the one side.

12. A method for manufacturing a flexible cover for a food container, the method comprising:
    arranging a flexible film on top of a fixture, whereby a portion of a peripheral edge of the flexible film is positioned outside an outer periphery of the fixture,
    applying and stretching an elastic thread along the outer periphery of the fixture, and positioning the elastic thread in a groove adapted to hold the elastic thread and arranged along the outer periphery of the fixture, said elastic thread forming a loop around the peripheral edge of the flexible film, the loop having two ends overlapping and abutting in a longitudinal direction of the elastic thread, whereby the elastic thread covers the portion of the peripheral edge of the flexible,
    folding the portion of the peripheral edge of the flexible film positioned outside the elastic thread around the elastic thread,
    attaching the elastic thread to the flexible film by attaching the folded portion of the flexible film positioned outside the elastic thread to a portion of the flexible film positioned inside the elastic thread, whereby a channel is created around the elastic thread film, the two ends overlap within the channel, and the two ends are enclosed by the channel, and
    releasing the flexible film and the elastic thread attached thereto from the fixture, whereby the channel exerts a circumferential, compressive force on the elastic thread and the elastic thread is fixed to the flexible film by friction between the flexible film and the elastic thread such that a locking effect is obtained by the friction.

13. The method according to claim 12, wherein arranging the flexible film on top of the fixture includes holding the flexible film to the fixture by an applied vacuum.

14. The method according to claim 12, wherein folding the portion of the peripheral edge of the flexible film positioned outside the elastic thread around the elastic thread is performed by a stream of hot air.

15. The method according to claim 12, wherein attaching the elastic thread to the flexible film by attaching the folded portion of the flexible film positioned outside the elastic thread to the portion of the flexible film positioned inside the elastic thread is performed by heat sealing.

16. The method according to claim 15, wherein the heat sealing is performed by the stream of hot air.

17. The method according to claim 12, wherein folding the portion of the peripheral edge of the flexible film positioned outside the elastic thread around the elastic thread and the heat sealing is performed in sequence by the stream of hot air.

18. The method according to claim 12, wherein the overlap of the two ends of the loop is configured to extend along one side of the food container.

19. The method according to claim 18, wherein the overlap is configured to extend along about an entire length of the one side.

* * * * *